United States Patent
Srihamat et al.

(10) Patent No.: US 8,949,672 B1
(45) Date of Patent: Feb. 3, 2015

(54) ANALYZING A DUMP FILE FROM A DATA STORAGE DEVICE TOGETHER WITH DEBUG HISTORY TO DIAGNOSE/RESOLVE PROGRAMMING ERRORS

(75) Inventors: Apisak Srihamat, Klonglung (TH); Kuan Chin Phan, Seri Kembangan (MY)

(73) Assignee: Western Digital Technologies, Inc., Irvine, CA (US)

(*) Notice: Subject to any disclaimer, the term of this patent is extended or adjusted under 35 U.S.C. 154(b) by 339 days.

(21) Appl. No.: 13/089,083

(22) Filed: Apr. 18, 2011

(51) Int. Cl.
*G06F 11/00* (2006.01)

(52) U.S. Cl.
USPC ........................................... 714/38.1

(58) Field of Classification Search
CPC .......................................... G06F 11/00
USPC ........................................... 714/38.1
See application file for complete search history.

(56) References Cited

U.S. PATENT DOCUMENTS

| | | | |
|---|---|---|---|
| 6,324,683 B1 | 11/2001 | Fuh et al. | |
| 6,938,245 B1 | 8/2005 | Spertus et al. | |
| 7,072,818 B1 * | 7/2006 | Beardslee et al. | 703/14 |
| 7,096,458 B2 | 8/2006 | Bates et al. | |
| 7,117,483 B2 | 10/2006 | Dorr et al. | |
| 7,171,337 B2 | 1/2007 | Yuan et al. | |
| 7,278,057 B2 * | 10/2007 | Betancourt et al. | 714/38.11 |
| 7,343,588 B2 | 3/2008 | Bates et al. | |
| 7,519,960 B2 | 4/2009 | Mei et al. | |
| 7,707,555 B2 | 4/2010 | Spertus et al. | |
| 8,069,407 B1 * | 11/2011 | Armandpour et al. | 715/234 |
| 8,074,115 B2 * | 12/2011 | Stolfo et al. | 714/38.1 |
| 8,375,386 B2 * | 2/2013 | Hendel | 718/1 |
| 8,694,833 B2 * | 4/2014 | Keromytis et al. | 714/38.1 |
| 2006/0277441 A1 | 12/2006 | Edgar et al. | |
| 2008/0127098 A1 | 5/2008 | Bates et al. | |
| 2008/0155512 A1 | 6/2008 | Bates et al. | |
| 2009/0031166 A1 * | 1/2009 | Kathail et al. | 714/4 |

* cited by examiner

*Primary Examiner* — Amine Riad

(57) ABSTRACT

A method is disclosed for diagnosing programming errors for a data storage device, wherein a dump file is received from the data storage device comprising program execution data. The dump file is converted into a plurality of debug stop records, wherein each debug stop record comprises trace information related to a programming error. A first debug stop record is evaluated relative to a history of debug stop records stored in a history database. When the first debug stop record corresponds to a second debug stop record in the history database, the programming error is resolved for the first debug stop record using resolution information associated with the second debug stop record.

22 Claims, 5 Drawing Sheets

US 8,949,672 B1

ANALYZING A DUMP FILE FROM A DATA STORAGE DEVICE TOGETHER WITH DEBUG HISTORY TO DIAGNOSE/RESOLVE PROGRAMMING ERRORS

BACKGROUND

Data storage devices, such as disk drives and solid state drives, are employed in numerous areas such as computer systems (e.g., desktops, laptops, portables, etc.) and consumer devices (e.g., music players, cell phones, cameras, etc.). The data storage device typically comprises a microprocessor for executing programs that control the internal operations as well as host interface functions. When developing a new line of data storage devices, a number of test procedures are typically performed during manufacturing in order to diagnose and resolve programming errors. Various techniques have been employed to analyze the programs, such as a conventional debugger which monitors the programs for errors while executing. However, when a programming error is identified for a particular line of data storage devices, the same programming error may manifest in other lines of data storage devices. It is therefore desirable to enable design engineers to collaborate during the program development phase, thereby avoiding duplicative effort to diagnose and resolve programming errors that may occur across different product lines.

DETAILED DESCRIPTION OF EMBODIMENTS OF THE INVENTION

Figures 1A, 1B:
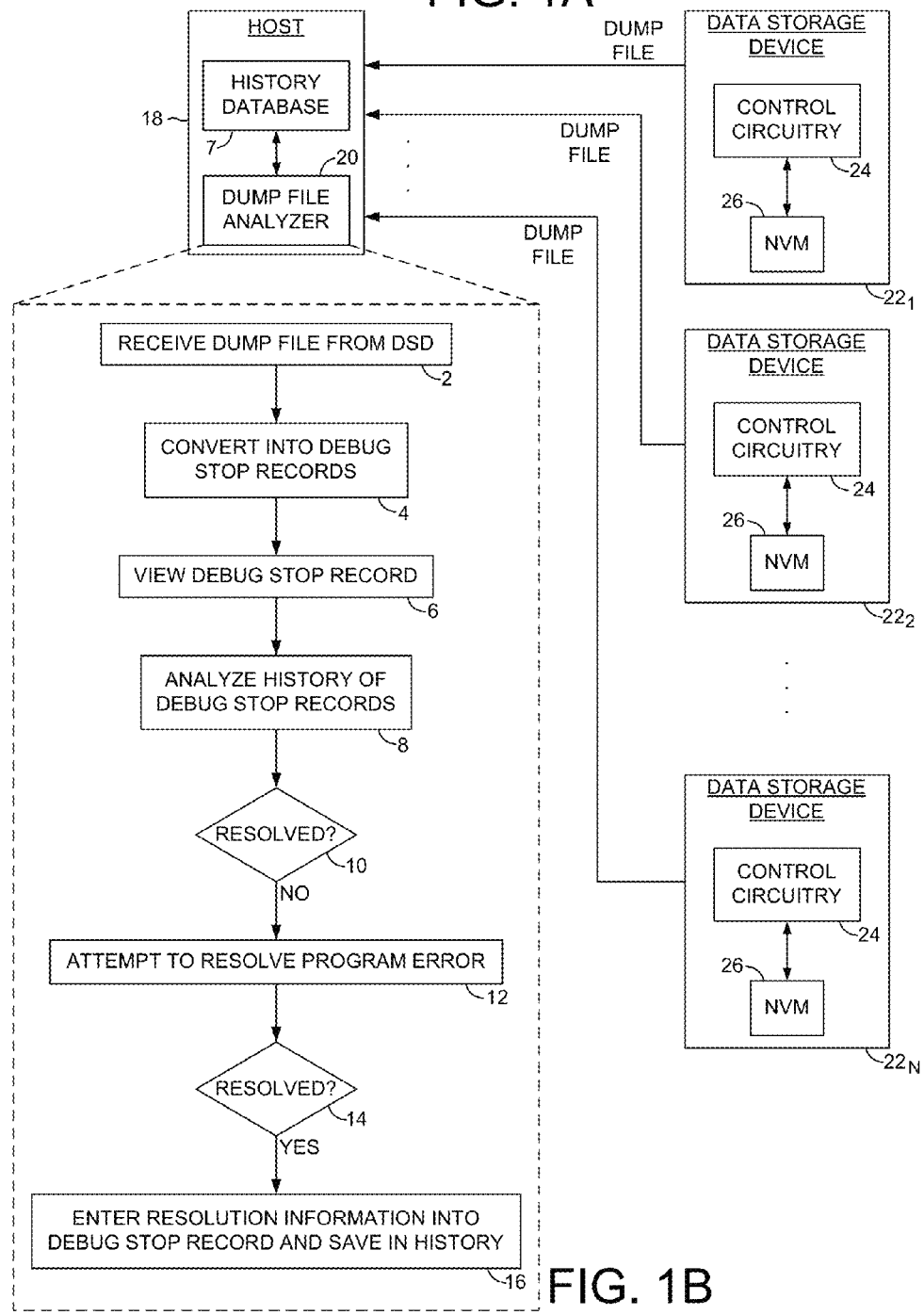
FIG. 1A shows a host maintaining a history database in response to a dump file received from a plurality of data storage devices according to an embodiment of the present invention.
FIG. 1B is a flow diagram according to an embodiment of the present invention wherein a debug stop record extracted from a dump file is evaluated relative to a history of debug stop records in the history database.

FIGS. 1A and 1B show a method of diagnosing programming errors for a data storage device according to an embodiment of the present invention. A dump file is received from the data storage device (step 2), wherein the dump file comprises program execution data. The dump file is converted into a plurality of debug stop records (step 4), wherein each debug stop record comprises trace information related to a programming error. A first debug stop record is evaluated (step 6) relative to a history of debug stop records stored in a history database 7 (step 8). When the first debug stop record corresponds to a second debug stop record in the history database, the programming error is resolved for the first debug stop record using second resolution information associated with the second debug stop record (step 10). When the first debug stop record does not correspond to any debug stop records in the history database, an attempt is made to resolve the programming error for the first debug stop record (step 12). When programming error is resolved (step 14), first resolution information is generated and associated with the first debug stop record, and the first debug stop record is stored in the history database (step 16).

In the embodiment of FIG. 1A, a host 18 executes a computer program (dump file analyzer 20) comprising code segments for diagnosing programming errors for a data storage device. The host 18 may comprise any suitable computer system, such as a personal computer (PC), a server accessed over a network, or a combination of computers. In one embodiment, the host 18 may comprise a server that stores the history database 7 which may be accessed by client computers over a network, wherein each client computer may execute the dump file analyzer 20 in order to evaluate one or more dump files from data storage devices.

FIG. 1A also illustrates an embodiment wherein a dump file is received from a plurality of data storage devices $22_1$-$22_N$, wherein each data storage device comprises control circuitry 24 and a non-volatile memory (NVM) 26, such as a disk or a non-volatile semiconductor memory (e.g., a flash memory). The control circuitry 24 comprises a microprocessor for executing a control program that controls the various operations of the data storage device, such as interfacing with a host and accessing the NVM 26. In one embodiment, the control program includes the ability to detect when a programming error has occurred, such as the occurrence of an unexpected interrupt or exception. When a programming error is detected, the control program saves program execution data associated with the error. The program execution data is saved in a dump file in the NVM 26 for uploading to the host 18 for analysis.

In one embodiment, a significant number of data storage devices may generate a large number of dump files that may be analyzed by different design engineers. For example, when developing a new line of data storage devices, there may be a number of design engineers analyzing hundreds of dump files that may be generated during the development stage. In addition, the control programs may be similar across different product lines such that the design engineers of different lines are often confronted with the same programming error (and same or similar resolution). The embodiments of the present invention enable multiple design engineers for a single or multiple product lines to analyze the dump files relative to a history of debug stop records saved in a history database 20. When a first debug stop record generated from the dump file of a data storage device matches a second debug stop record stored in the history database, the resolution information associated with the second debug stop record can be used to resolve the problem rather than waste valuable development time solving the same programming errors over and over.

Figure 2:
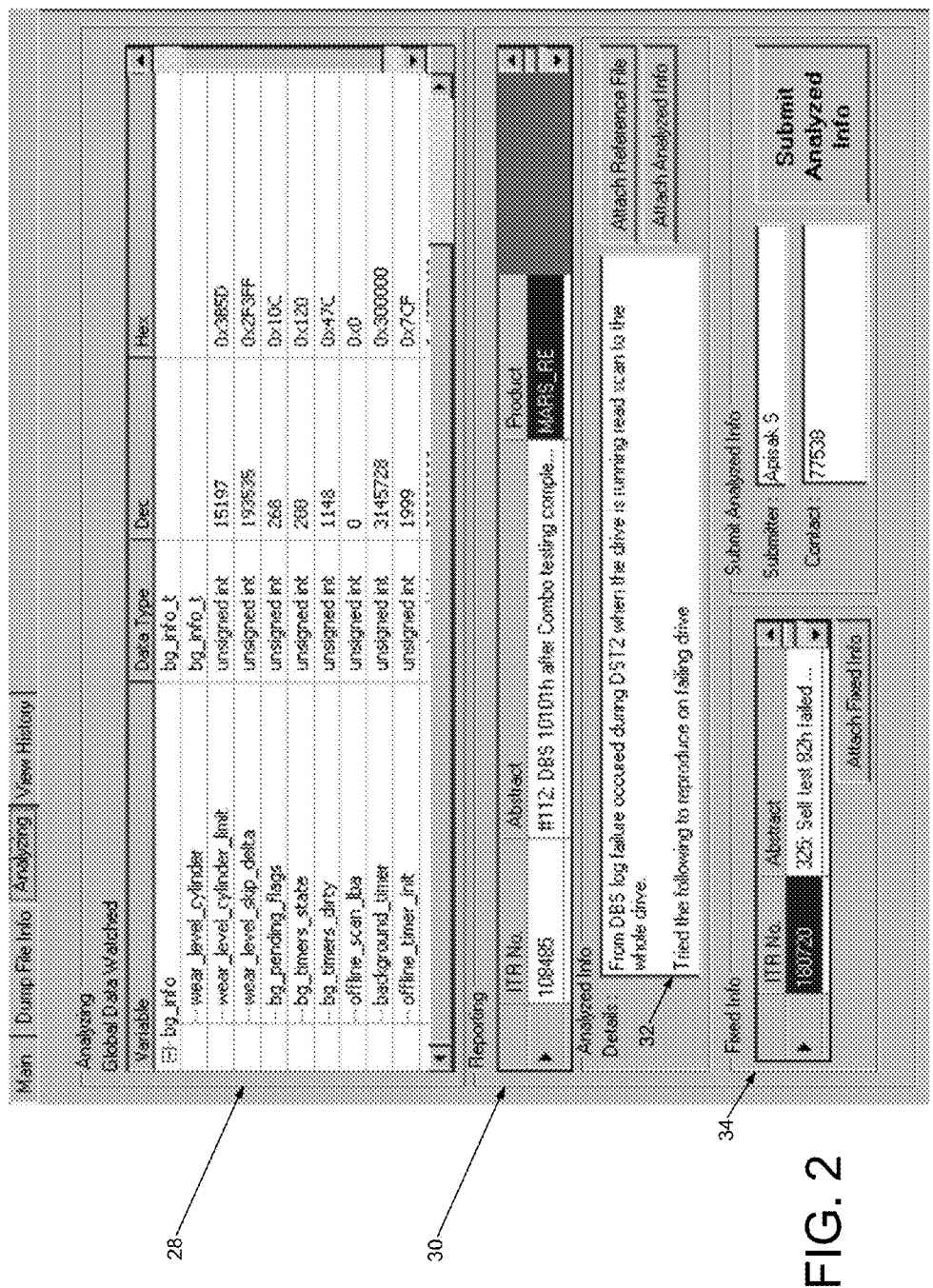
FIG. 2 shows a screenshot of a computer program for diagnosing programming errors for one of the data storage devices by evaluating its dump file according to an embodiment of the present invention.

FIG. 2 shows a screenshot generated by the dump file analyzer 20 according to an embodiment of the present invention. In this embodiment, the program execution data stored in the dump file received from a data storage device is converted into a plurality of debug stop records, wherein each debug stop record comprises trace information related to a programming error and an identifier (debug stop number) that identifies the type of error that occurred. In the example of FIG. 2, the screen shot is displaying information for a single debug stop record, including trace information 28 such as the name and value of variables, register values, code segments being executed, etc.

In the embodiment of FIG. 2, the design engineer analyzing the debug stop record and creates reporting information 30, including an issue tracking report (ITR) having a designated ITR number (108485 in the example shown). An abstract is generated for the debug stop record describing the programming error, including the debug stop number (10101h in the example shown). A product name is also assigned to the debug stop recorded identifying the product line that generated the dump file (MARS_RE in the example shown). In text field 32, the design engineer may enter a detailed description of the programming error together with the conditions needed to reproduce the error. The design engineer may also attach an external file to the debug stop record that provides further information about the programming error.

In field 34 of FIG. 2, the design engineer enters a fixed ITR number (180720 in the example shown). The fixed ITR number has associated with it resolution information indicating how the programming error was resolved. In the example shown, the resolution information comprises an abstract providing a brief description of the resolution, and may have a file attached including additional resolution information. As described in greater detail below, the fixed ITR number may be associated with an existing debug stop record stored in the history database 7. That is, the design engineer analyzing the current debug stop record may search and discover a similar debug stop record in the history database. If such a record is found and the associated resolution information determined to be helpful, the design engineer may assign the fixed ITR number from the database record to the current debug stop record being analyzed. If a similar debug stop record is not found the history database, the design engineer may resolve the problem independently and then generate a new fixed ITR number as well as new resolution information. The current debug stop record and associated resolution information is then saved in the history database for future evaluation when analyzing subsequent debug stop records. In one embodiment, a fixed ITR number may be assigned multiple times to different debug stop records (having different ITR numbers) since a fixed ITR number may be useful in resolving the programming error associated with multiple debug stop records. In yet another embodiment, multiple fixed ITR numbers may be assigned to the same debug stop record since the resolution to a particular programming error may be multi-faceted.

Figure 3:
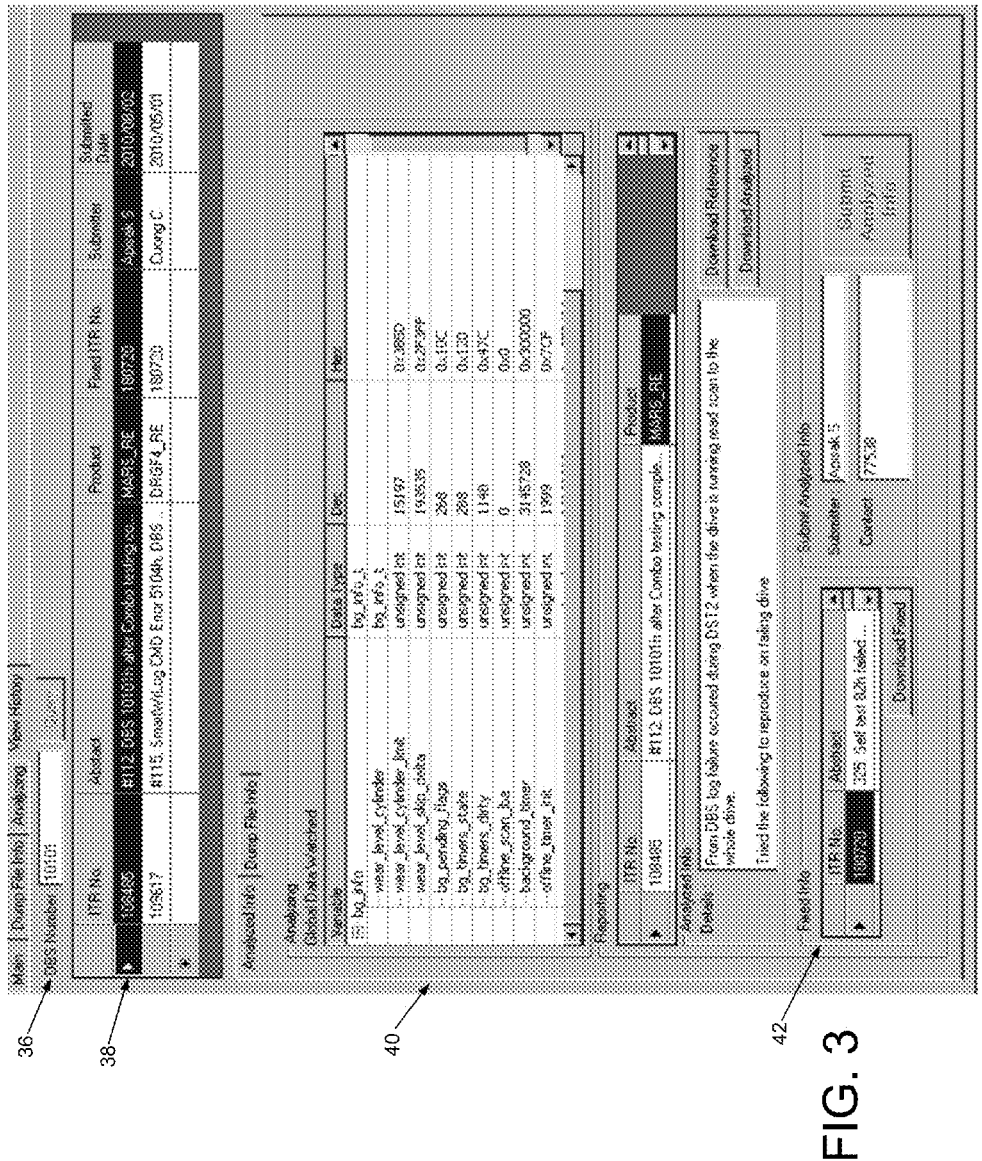
FIG. 3 shows a screenshot of the computer program wherein the history database is searched based on a debug stop number according to an embodiment of the present invention.

FIG. 3 shows a screenshot generated by the dump file analyzer 20 according to an embodiment of the present invention. In this embodiment, a design engineer may enter an identifier associated with the debug stop records (e.g., a field 36 for entering a debug stop number). The dump file analyzer then searches the history database 7 and displays (in box 38) a list of debug stop records that correspond to the identifier. For example, when a design engineer is evaluating a new debug stop record for a particular data storage device (using the screen shown in FIG. 2), the design engineer may navigate to the screen of FIG. 3 in order to search the history database for similar records. In the example shown in FIG. 3, the design engineer has entered a debug stop number 10101 into the search field, and a list of debug stop records has been displayed (in box 38) that also include the debug stop number (e.g., in the Abstract). The design engineer may then select one of the debug stop records in the list (the first record in the example shown), wherein the information for the debug stop record is displayed below (in box 40). The design engineer may evaluate the description of the archived debug stop record to determine whether it is relevant to the current debug stop record being analyzed. If the archived debug stop record is relevant, the design engineer may then attempt to resolve the programming error using the resolution information 42 associated with the archived debug stop record.

Any suitable search criteria may be employed in the embodiments of the present invention for searching the debug stop records archived in the history database 7. In an alternative embodiment, a design engineer may search the history database 7 using a key word search. In yet another embodiment, the history database 7 may be searched using the trace information stored with a debug stop record, wherein a match may be found if a certain percentage of the trace information matches.

Figure 4:
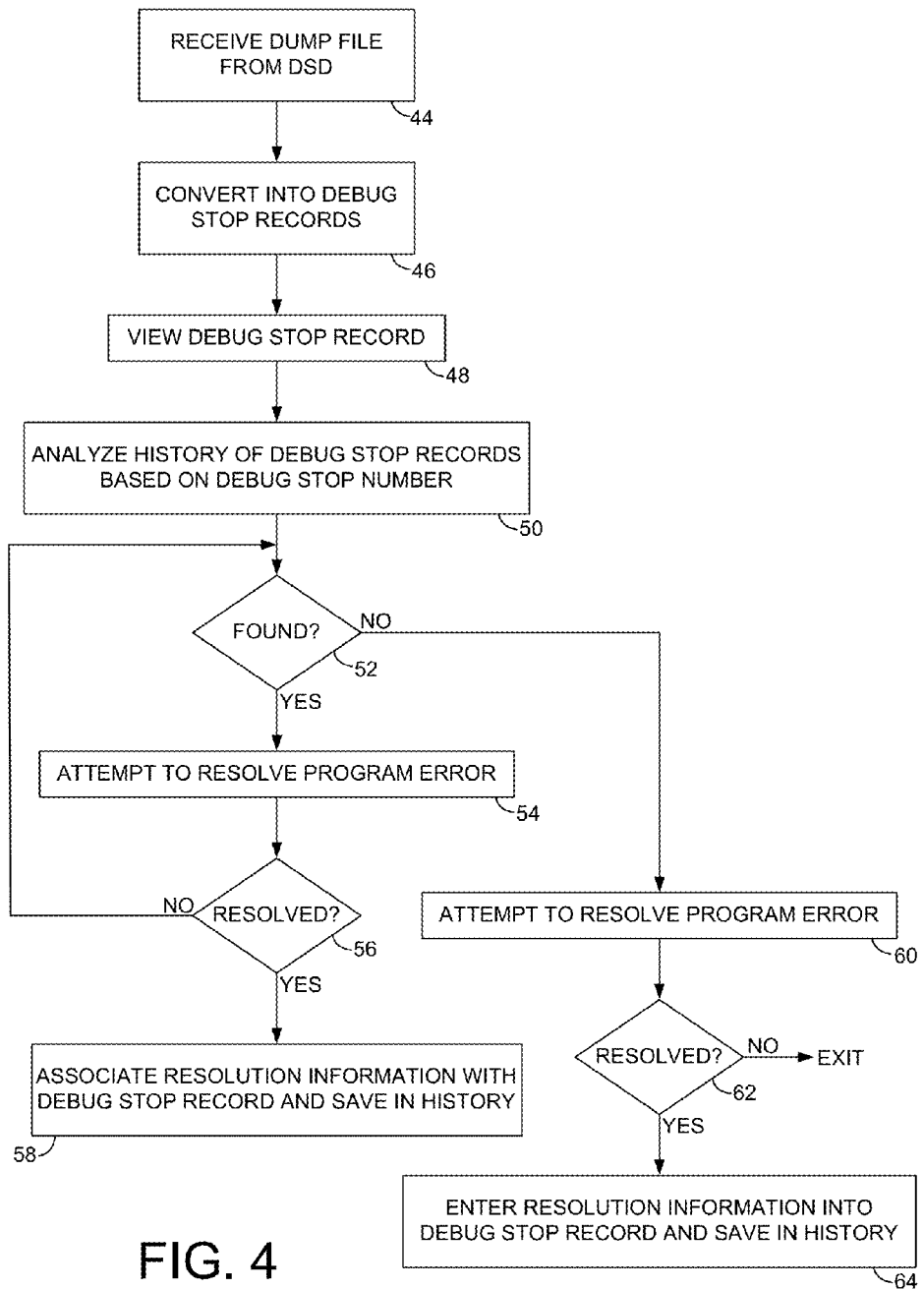
FIG. 4 is a flow diagram according to an embodiment of the present invention wherein a debug stop record is generated from a dump file from a data storage device and then evaluated relative to the debug stop records stored in the history database.

FIG. 4 is a more detailed flow diagram according to an embodiment of the present invention, wherein when a dump file is received from a data storage device (step 44), it is converted into a plurality of debug stop records (step 46). One of the debug stop records may then be selected for viewing (step 48) such as shown in FIG. 2. The history database comprising the archived debug stop records is then evaluated (step 50) to determine if there are any matches (e.g., as shown in FIG. 3). If a matching archived debug stop record is found (step 52), its resolution information is utilized in an attempt to resolve the programming error associated with the currently analyzed debug stop record (step 54). If the programming error is resolved (step 56), the resolution information associated with the archived debug stop record is associated with the currently analyzed debug stop record, and the currently analyzed debug stop record is saved in the history database (step 58). If the programming error is not resolved (step 56), the process is repeated starting at step 52 for the next matching debug stop record. If there are no more matching records, an attempt is made to resolve the programming error independent of the history database (step 60). If the programming error is resolved (step 62), the resolution information is saved with the currently analyzed debug stop record, and the debug stop record is saved in the history database (step 64). In this manner, the newly archived debug stop record may be used to resolve similar programming errors encountered when subsequent debug stop records are analyzed.

Figure 5:
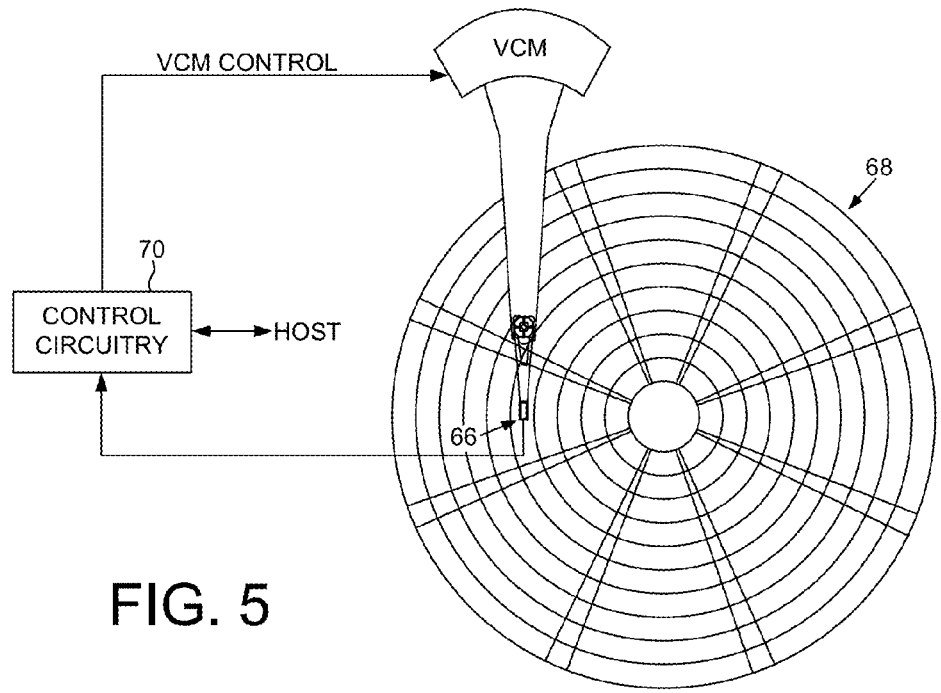
FIG. 5 shows an embodiment of the present invention wherein the data storage device comprises a head actuated over a disk.
Figure 6:
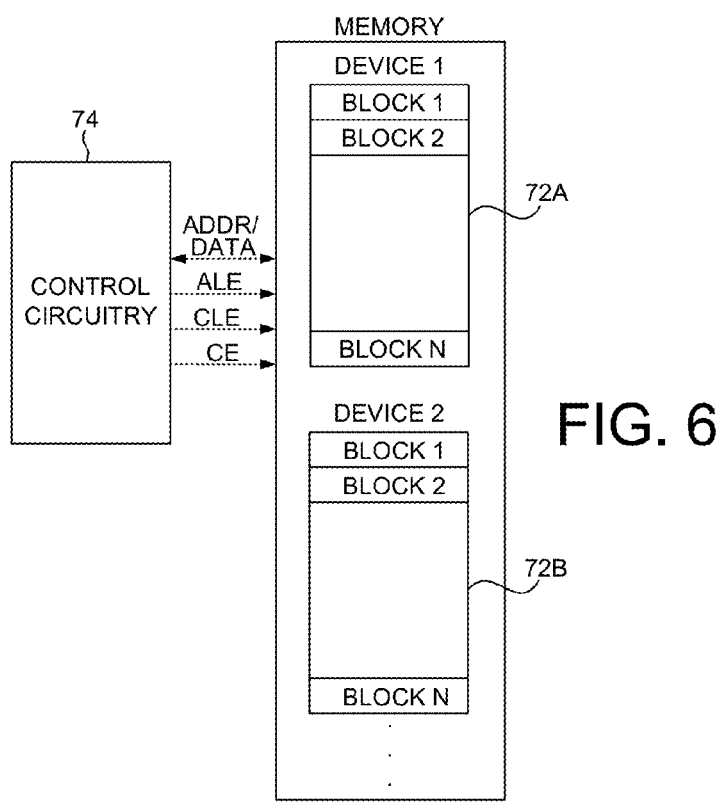
FIG. 6 shows an embodiment of the present invention wherein the data storage device comprises a non-volatile semiconductor memory (e.g., a flash memory).

The embodiments of the present invention may be employed in any suitable data storage device. FIG. 5 shows a data storage device comprising a disk drive including a head 66 actuated over a disk 68 and control circuitry 70 for executing at least part of the flow diagrams described herein. FIG. 6 shows a solid state drive comprising a plurality of non-volatile semiconductor memories 72A, 72B, etc., such as flash memories, and control circuitry 74 for executing at least part of the flow diagrams described herein. A hybrid data storage device may also be employed comprising components of a disk drive shown in FIG. 5 combined with the non-volatile semiconductor memories shown in FIG. 6.

In one embodiment, the data storage devices may generate dump files while executing development procedures and/or manufacturing procedures before being shipped to customers. In this embodiment, each data storage device may be connected to a test station which uploads the dump file from the NVM 26. The dump file may be evaluated at the test station, or it may be forwarded to a server over a network for subsequent evaluation. In an alternative embodiment, the data storage devices may generate the dump files while operating in the field after being shipped to customers. The dump files may then be uploaded to a server over a network (e.g., via the Internet) where it can be analyzed by the manufacturer.

The host 18 in FIG. 1A may comprise any suitable circuitry for implementing the flow diagrams herein, such as one or more integrated circuits. In one embodiment, the host 18 may comprise a computer system comprising at least one microprocessor for executing code segments of a computer program embodied on any suitable computer readable medium.

What is claimed is:

1. A method of diagnosing programming errors for a data storage device, the method comprising:
   receiving a dump file from the data storage device, wherein the dump file comprises program execution data;
   converting the dump file into a plurality of debug stop records, wherein each debug stop record comprises trace information related to a programming error;
   evaluating a first debug stop record relative to a history of debug stop records stored in a history database;
   when the first debug stop record corresponds to a second debug stop record in the history database, providing second resolution information associated with the second debug stop for resolution of the programming error for the first debug stop record; and
   when the first debug stop record does not correspond to any debug stop records in the history database:
      obtaining first resolution information relating to resolution of the programming error for the first debug stop record;
      associating the first resolution information with the first debug stop record; and
      storing the first debug stop record in the history database,
      wherein the first and second resolution information is generated and entered into the history database by a user and comprises a description of the respective resolution.

2. The method as recited in claim 1, wherein the first debug stop record comprises an identifier, further comprising searching the history database using the identifier.

3. The method as recited in claim 2, further comprising displaying a plurality of debug stop records in the history database corresponding to the identifier.

4. The method as recited in claim 3, wherein when a user selects one of the plurality of debug stop records, further comprising displaying resolution information for the selected debug stop record.

5. The method as recited in claim 1, wherein the second resolution information comprises a data file attached to the second debug stop record.

6. The method as recited in claim 1, when the first debug stop record corresponds to a second debug stop record in the history database, further comprising:
   associating the second resolution information with the first debug stop record; and
   storing the first debug stop record in the history database.

7. The method as recited in claim 1, wherein the data storage device comprises a head actuated over a disk.

8. The method as recited in claim 1, wherein the data storage device comprises a non-volatile semiconductor memory.

9. Non-transitory computer readable medium comprising a computer program, the computer program comprising code segments for diagnosing programming errors for a data storage device, wherein the code segments, when executed by a processor, cause the processor to perform a method comprising:
   receiving a dump file from the data storage device, wherein the dump file comprises program execution data;
   converting the dump file into a plurality of debug stop records, wherein each debug stop record comprises trace information related to a programming error;
   evaluating a first debug stop record relative to a history of debug stop records stored in a history database;
   when the first debug stop record corresponds to a second debug stop record in the history database, providing second resolution information associated with the second debug stop for resolution of the programming error for the first debug stop record; and
   when the first debug stop record does not correspond to any debug stop records in the history database:
      obtaining first resolution information relating to resolution of the programming error for the first debug stop record;
      associating the first resolution information with the first debug stop record; and
      storing the first debug stop record in the history database,
      wherein the first and second resolution information is generated and entered into the history database by a user and comprises a description of the respective resolution.

10. The non-transitory computer readable medium as recited in claim 9, wherein the first debug stop record comprises an identifier, further comprising code segments that, when executed by the processor, cause the processor to perform searching the history database using the identifier.

11. The non-transitory computer readable medium as recited in claim 10, further comprising code segments that, when executed by the processor, cause the processor to perform identifying a plurality of debug stop records in the history database corresponding to the identifier.

12. The non-transitory computer readable medium as recited in claim 11, wherein when a user selects one of the plurality of debug stop records, further comprising code segments that, when executed by the processor, cause the processor to perform identifying resolution information for the selected debug stop record.

13. The non-transitory computer readable medium as recited in claim 9, wherein the second resolution information comprises a data file attached to the second debug stop record.

14. The non-transitory computer readable medium as recited in claim 9, when the first debug stop record corresponds to a second debug stop record in the history database, further comprising code segments that, when executed by the processor, cause the processor to perform:
   associating the second resolution information with the first debug stop record; and
   storing the first debug stop record in the history database.

15. The non-transitory computer readable medium as recited in claim 9, wherein the data storage device comprises a head actuated over a disk.

16. The non-transitory computer readable medium as recited in claim 9, wherein the data storage device comprises a non-volatile semiconductor memory.

17. A computer system comprising a computer program and a processor for executing the computer program, the computer program comprising code segments for diagnosing programming errors for a data storage device, the computer system executing the computer program with the processor to perform operations comprising:
   receiving a dump file from the data storage device, wherein the dump file comprises program execution data;

converting the dump file into a plurality of debug stop records, wherein each debug stop record comprises trace information related to a programming error;

evaluating a first debug stop record relative to a history of debug stop records stored in a history database;

when the first debug stop record corresponds to a second debug stop record in the history database, providing second resolution information associated with the second debug stop for resolution of the programming error for the first debug stop record; and when the first debug stop record does not correspond to any debug stop records in the history database:
  obtaining first resolution information relating to resolution of the programming error for the first debug stop record;
  associating the first resolution information with the first debug stop record; and
  storing the first debug stop record in the history database,
  wherein the first and second resolution information is generated and entered into the history database by a user and comprises a description of the respective resolution.

18. The computer system as recited in claim 17, wherein the first debug stop record comprises an identifier, the computer program further comprising code segments for searching the history database using the identifier.

19. The computer system as recited in claim 18, wherein the computer program further comprising code segments for identifying a plurality of debug stop records in the history database corresponding to the identifier.

20. The computer system as recited in claim 19, wherein when a user selects one of the plurality of debug stop records, the computer program further comprising code segments for identifying resolution information for the selected debug stop record.

21. The computer system as recited in claim 17, wherein the second resolution information comprises a data file attached to the second debug stop record.

22. The computer system as recited in claim 17, when the first debug stop record corresponds to a second debug stop record in the history database, the computer program further comprising code segments for:
  associating the second resolution information with the first debug stop record; and
  storing the first debug stop record in the history database.

* * * * *